United States Patent
Sham et al.

(10) Patent No.: US 8,335,601 B2
(45) Date of Patent: Dec. 18, 2012

(54) SYSTEM AND METHOD OF AUTOMATED FAULT ANALYSIS AND DIAGNOSTIC TESTING OF AN AIRCRAFT

(75) Inventors: Nagaraj Sham, Karnataka (IN); Anil Kumar Pandit, Karnataka (IN); Kiran Halappa, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 748 days.

(21) Appl. No.: 12/481,260

(22) Filed: Jun. 9, 2009

(65) Prior Publication Data

US 2010/0312420 A1    Dec. 9, 2010

(51) Int. Cl.
- G01C 23/00    (2006.01)
- G05D 1/00    (2006.01)
- G05D 3/00    (2006.01)
- G06F 7/00    (2006.01)
- G06F 17/00    (2006.01)

(52) U.S. Cl. ............. 701/3; 701/14; 701/29.1; 340/3.1; 340/945

(58) Field of Classification Search ............... 701/3, 14, 701/29, 29.1; 340/3.1, 945; 360/31; 705/305; 714/30

See application file for complete search history.

(56) References Cited

U.S. PATENT DOCUMENTS

| | | | |
|---|---|---|---|
| 4,943,919 A * | 7/1990 | Aslin et al. ........................ 701/3 |
| 5,931,877 A * | 8/1999 | Smith et al. .................... 701/31.5 |
| 5,974,349 A * | 10/1999 | Levine .......................... 701/29.6 |
| 6,003,808 A | 12/1999 | Nguyen et al. |
| 6,259,977 B1 | 7/2001 | Mayer et al. |
| 7,173,526 B1 | 2/2007 | Monroe |
| 7,209,814 B2 | 4/2007 | Kipersztok et al. |
| RE39,618 E | 5/2007 | Levine |
| 2002/0010532 A1 | 1/2002 | Sinex |
| 2004/0106404 A1* | 6/2004 | Gould et al. ................... 455/431 |
| 2004/0153800 A1* | 8/2004 | Germanetti ...................... 714/30 |
| 2004/0176887 A1* | 9/2004 | Kent et al. ....................... 701/30 |

(Continued)

FOREIGN PATENT DOCUMENTS

| | | |
|---|---|---|
| EP | 0810558 A2 | 12/1997 |
| EP | 2266880 A1 * | 12/2010 |
| GB | 2389910 A | 12/2003 |

OTHER PUBLICATIONS

EP Search Report, EP 10164882-2206 dated Oct. 19, 2010.

*Primary Examiner* — Dalena Tran
*Assistant Examiner* — Jamie Figueroa
(74) *Attorney, Agent, or Firm* — Ingrassia Fisher & Lorenz, P.C.

(57) ABSTRACT

A system for automated fault analysis and execution of post-flight or pre-flight tests for an aircraft is provided. The system includes a maintenance test client system onboard the aircraft, and a ground-based maintenance test server system that is remote from the aircraft. The maintenance test client system is configured to collect fault data for the aircraft, and to wirelessly transmit the fault data to the ground-based maintenance test server system after the aircraft has landed. The ground-based maintenance test server system is configured to receive the fault data, to generate a test checklist that is influenced by the fault data, and to transmit the test checklist to the maintenance test client system. The maintenance test client system wirelessly receives the test checklist, and initiates execution of at least one test specified in the test checklist.

19 Claims, 3 Drawing Sheets

U.S. PATENT DOCUMENTS

| | | | |
|---|---|---|---|
| 2005/0055239 A1* | 3/2005 | Farmer | 705/1 |
| 2005/0149238 A1* | 7/2005 | Stefani et al. | 701/33 |
| 2007/0027589 A1* | 2/2007 | Brinkley et al. | 701/3 |
| 2008/0005617 A1* | 1/2008 | Maggiore et al. | 714/30 |
| 2008/0147740 A1 | 6/2008 | Bailly et al. | |
| 2008/0249678 A1 | 10/2008 | Bailly et al. | |
| 2008/0304418 A1 | 12/2008 | Fournier et al. | |
| 2009/0150022 A1* | 6/2009 | McMillin et al. | 701/35 |

* cited by examiner

SYSTEM AND METHOD OF AUTOMATED FAULT ANALYSIS AND DIAGNOSTIC TESTING OF AN AIRCRAFT

TECHNICAL FIELD

Embodiments of the subject matter described herein relate generally to safety, maintenance, and diagnostic systems for aircraft. More particularly, the subject matter relates to an automated fault analysis and diagnostic testing system for an aircraft.

BACKGROUND

The prior art is replete with systems and technologies related to the diagnosis of faults and/or the maintenance of aircraft. For example, the prior art includes onboard systems that are designed to monitor operational aircraft data, flight status data, and other data during the different phases of a flight. Such onboard systems can collect, analyze, and interpret data, generate fault data if necessary, and generate fault reports. In accordance with conventional procedures, fault data collected during flight is analyzed post-flight to determine a maintenance routine for the aircraft.

Proper maintenance increases the useful life of aircraft, and following strict maintenance procedures increases flight safety. Thus, it is important for an aircraft to be designated "flight worthy" before each takeoff. Historically, aircraft have been maintained by specially trained and qualified personnel who are authorized to conduct certain flight worthy tests before takeoff. Upon arrival of an aircraft, the maintenance engineers perform the flight worthy tests, and then generate a report for clearance from the air traffic controller. The maintenance engineers must usually follow defined procedures that are mandated by certain regulatory bodies or agencies, such as the FAA.

It may be necessary for maintenance personnel to perform certain post-flight and pre-flight tests (such tests may be routine tests or tests that are specifically intended to address items contained in a fault report). In accordance with conventional procedures, however, fault data or fault reports from the previous flight leg are analyzed manually (i.e., by an engineer or other maintenance personnel). Moreover, post-flight and pre-flight tests are performed manually by the maintenance engineer or flight engineer. Furthermore, a test results report, which is necessary to obtain takeoff clearance from the air traffic controller, is manually generated. Such manual intervention and reliance on human personnel can be time consuming and costly. In addition, manual techniques can introduce an element of human error.

BRIEF SUMMARY

A method of automated fault analysis and execution of post-flight or pre-flight tests for an aircraft is provided. The aircraft includes an onboard maintenance test client system, and the method begins by establishing a data communication session with the onboard maintenance test client system after the aircraft has landed, the data communication session using at least one wireless data communication link. The method continues by receiving diagnostic data from the onboard maintenance test client system during the data communication session, generating a test checklist for the aircraft, and transmitting the test checklist to the onboard maintenance test client system during the data communication session. The content of the test checklist is influenced by the diagnostic data.

Another method of automated fault analysis and execution of post-flight or pre-flight tests for an aircraft is also provided. This method begins by establishing a data communication session with a ground-based system after the aircraft has landed, the data communication session using at least one wireless data communication link. The method continues by sending diagnostic data to the ground-based system during the data communication session. Thereafter, the method obtains a test checklist for the aircraft from the ground-based system, wherein content of the test checklist is influenced by the diagnostic data. Next, the method completes at least one test specified in the test checklist.

Also provided is a system for automated fault analysis and execution of post-flight or pre-flight tests for an aircraft. The system includes a maintenance test client system onboard the aircraft and a ground-based maintenance test server system that is remote from the aircraft. The maintenance test client system is configured to collect fault data for the aircraft, and to wirelessly transmit the fault data to the ground-based maintenance test server system after the aircraft has landed. The ground-based maintenance test server system is configured to receive the fault data, to generate a test checklist that is influenced by the fault data, and to transmit the test checklist to the maintenance test client system. The maintenance test client system wirelessly receives the test checklist, and initiates execution of at least one test specified in the test checklist.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
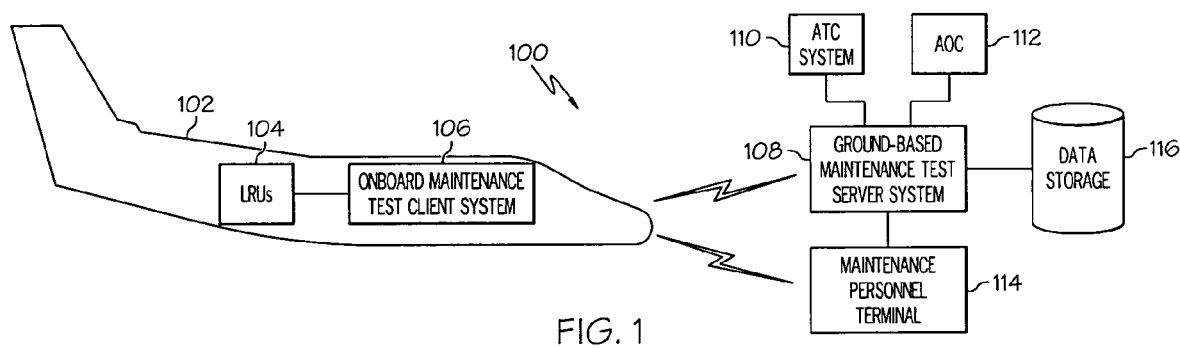
FIG. 1 is a schematic representation of onboard and ground-based elements of an automated fault analysis and testing system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

A number of maintenance checks and tests are performed on an aircraft prior to departure. These checks and tests may involve diagnostic tests of mechanical devices such as braking system components, flaps, and landing gear, and/or diagnostic tests of electronic devices. Tests that usually follow power up of an aircraft typically include, without limitation: power up checks; pre-flight checks; pre-flight preparation checks; before start checks; before taxi checks; taxi out checks; and before takeoff checks. Post-flight tests typically include, without limitation: taxi in checks; after parking checks; and termination checks. Historically, most (if not all) of these checks and tests are performed manually or otherwise require the involvement of human operators or maintenance personnel.

In contrast to conventional systems and procedures, the automated fault analysis and testing system described herein wirelessly transmits fault and diagnostic data from the aircraft to a ground-based maintenance test server system, which then analyzes the received data and generates an applicable maintenance test checklist for the aircraft. The test checklist is sent back to an onboard maintenance test client system, which then controls the execution of the tests specified in the test checklist. In certain embodiments, the tests are performed in an automated manner and without any human intervention during the tests. Upon completion of the tests, the onboard client system prepares a consolidated report that conveys the results of the tests. This report can then be sent to one or more remote systems (e.g., a maintenance personnel terminal, an air traffic control system, an airlines operations center, or the like). The report can be reviewed and analyzed to determine whether the aircraft can be approved for takeoff.

FIG. 1 is a schematic representation of onboard and ground-based elements of an automated fault analysis and testing system 100. The onboard components of the system 100 are located onboard and/or are attached to an aircraft 102. These onboard components may include, without limitation, a number of line replaceable units (LRUs) 104 and an onboard maintenance test client system 106, which is coupled to the LRUs 104. The onboard components are coupled together in a physical and/or wireless manner to accommodate the exchange, transfer, or transmission of data, control signals, commands, instructions, power, etc. The ground-based components of the system 100 may include, without limitation: a ground-based maintenance test server system 108; an air traffic control (ATC) system 110; an airlines operations center (AOC) 112; a maintenance personnel terminal 114; and a data storage element 116. The ground-based components are coupled together in a physical and/or wireless manner to accommodate the exchange, transfer, or transmission of data, control signals, commands, instructions, power, etc. Although not explicitly depicted in FIG. 1, the different elements and components of the system 100 can communicate with one another as needed to support the operations and functionality of the system 100, as described in more detail below. For example, the ATC system 110 could communicate with the AOC 112 via one or more wired or wireless data communication links (not shown in FIG. 1). As another example, the AOC 112 could communicate with the client system 106 using one or more wired or wireless data communication links (not shown in FIG. 1).

Each LRU 104 represents a physical unit that contains electronic hardware and embedded application-specific software that is written to support the intended function of the LRU 104. For example, the LRUs 104 may be associated with certain features, functions, and subsystems of the aircraft 102, such as: data communication; fault storage; trend analysis; command control surfaces; etc. For the system 100 described here, each LRU 104 is suitably configured to support, execute, or conduct one or more maintenance tests, which may be initiated, guided, regulated, or controlled by the client system 106. In this regard, the client system 106 cooperates with the LRUs 104 to execute tests specified in one or more maintenance test checklists. The client system 106 may be realized with any number of hardware, software, processor, or firmware modules that cooperate to support the various functions and operations described in more detail below. In this regard, an exemplary embodiment of the client system 106 is described in more detail below with reference to FIG. 2.

The server system 108 is preferably located at the airport or other destination of the aircraft 102, and the server system 108 is remote from (and physically distinct from) the aircraft 102. Thus, in a commercial implementation of the system 100, multiple instantiations of the server system 108 will be deployed (e.g., at least one at each desired airport). The server system 108 may be realized with any number of hardware, software, processor, or firmware modules. The server system 108 may be implemented using one computing device or machine, or it may be deployed in a distributed manner using a plurality of physically distinct computing devices or machines. In practice, the server system 108 will include one or more suitably configured processors, memory, and one or more suitably written software applications that cooperate to support the various functions and operations described in more detail below.

The ATC system 110 is used to regulate and control air traffic for the airport and surrounding areas. In this regard, the ATC system 110 is suitably configured to carry out common and well known ATC operations and functions. For example, personnel using the ATC system 110 (and/or the AOC 112) might be responsible for reviewing post-flight and pre-flight test results to determine whether the aircraft 102 is flight worthy. If so, then personnel using the ATC system 110 (and/or the AOC 112) will approve or authorize the aircraft for takeoff.

The AOC 112 is used for airline-specific communications, control, and regulation. The AOC 112 may represent a command center for the particular airline associated with the aircraft 102, or the AOC 112 may represent a shared command center for a plurality of different airlines. The AOC 112 is suitably configured to carry out common and well known AOC operations and functions. For example, personnel using the AOC 112 might be responsible for providing AOC approval for takeoff after reviewing post-flight and pre-flight test results or after receiving ATC approval. As described in more detail below, the AOC 112 may communicate its takeoff approval to the client system 106.

The maintenance personnel terminal 114 is physically distinct from the aircraft 102. In certain embodiments, the maintenance personnel terminal 114 is remote from the aircraft 102, and it may be located at the AOC 112. In some embodiments, the maintenance personnel terminal 114 can be realized with a portable computing device, such as a laptop computer, a mobile computing device, a personal digital assistant, or the like. The maintenance personnel terminal 114 is suitably configured to communicate with the server system 108, the client system 106, and possibly other elements of the system 100 (e.g., the AOC 112 or the ATC system 110). In preferred embodiments, the client system 106 establishes an interactive control session with the maintenance personnel terminal 114 so that maintenance tests can be initiated, supervised, or otherwise controlled by the maintenance personnel terminal 114. In this regard, the maintenance personnel terminal 114 could be suitably configured to remotely control execution of at least one of the tests specified in a maintenance test checklist.

The data storage element 116 may be realized using one or more physical devices having appropriate computer readable media. In practice, the data storage element 116 may utilize: EEPROM; flash memory; CD, DVD, or other optical storage technology; magnetic cassettes, magnetic tape, magnetic disk storage, or other magnetic storage devices; or any other medium which can be used to store the desired information and which can accessed by a computing device. For the system 100 described here, the data storage element 116 can be utilized to store diagnostic data and fault reports obtained from the client system 106, to store maintenance test checklists for the aircraft 102 and for other aircraft, to store fault analysis reports prepared by the server system 108, to store test results, and to store other information and data as needed to support the operation of the system 100.

In an embodiment of the system 100, the data storage element 116 is used to store information related to LRU-specific data such as, without limitation: mean time between faults (MTBF); mean time between unscheduled removals (MTBUR); mean time to unscheduled removal (MTTUR); mean time between removal (MTBR); software versions loaded; database loaded; etc. Such information can be collected and saved for some or all of the LRUs onboard the aircraft. The use of a centralized ground-based repository for such information is desirable for purposes of safekeeping and robustness. Use of a ground-based data storage element 116 in this manner allows the system to keep track of the LRU-specific data and generate associated warning, reminder, and maintenance messages based on the information available for each aircraft.

Figure 2:
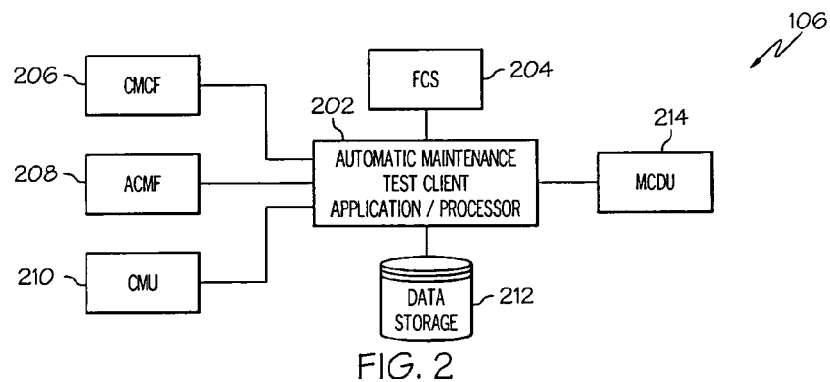
FIG. 2 is a schematic representation of an onboard maintenance test client system.

FIG. 2 is a schematic representation of one possible embodiment of the onboard maintenance test client system 106. This particular embodiment includes an automatic maintenance test client module 202, which may be realized using one or more applications and one or more processor devices. Client module 202 is coupled to or cooperates with other devices, components, and functional modules of the client system 106. For example, client module 202 may cooperate with the following elements, without limitation: a flight control system (FCS) 204; a central maintenance computing function (CMCF) 206; an airplane condition monitoring function (ACMF) 208; a communication management function (CMF) 210; a data storage element 212; and a multifunction control and display unit (MCDU) 214.

The client module 202 may also be referred to as an "electronic flight bag" because it is suitably configured to process, analyze, and provide flight related information such as weather status, flight status, flight data, and the like. Moreover, client module 202 may interact with the other components of the client system 106 as needed to support the operation of the system 100. These functions and operations are described in more detail below with reference to FIGS. 3-5.

The FCS 204 is used to command the control surfaces of the aircraft, as is well understood. The control surfaces typically include, without limitation, primary and secondary surfaces of the aircraft such as the rudder, aileron, flaperon, elevator, etc. In this regard, the FCS 204 is suitably configured to control the operation and testing of the LRUs shown in FIG. 1. Thus, the FCS 204 can receive test related instructions and commands from the client module 202 (e.g., commands for initializing maintenance tests), and the FCS 204 can send test data, test results, and/or test reports to the client module 202.

The CMCF 206 and the ACMF 208 retrieve flight data, fault data, and other flight-related information during operation (flight) of the aircraft. The CMCF 206 and the ACMF 208 can monitor the collected data to determine when a fault or error has occurred. In the event of a detected fault, the CMCF 206 generates CMCF fault data, which can be passed to the client module 202 for processing and/or storage in the data storage element 212. Similarly, the ACMF 208 may generate ACMF fault data, which can be sent to the client module 202 for processing and/or storage in the data storage element 212.

The CMU 210 manages data communication to and from the client system 106. Depending upon the particular implementation and the desired feature set, the CMU 210 may support wireless data communication and/or data communications over a tangible link. For wireless data communication, the CMU 210 supports one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; satellite data communication protocols; GPRS; and proprietary wireless data communication protocols such as variants of Wireless USB. In certain embodiments, the CMU 210 wirelessly communicates with the server system 108 (see FIG. 1) using a relatively short range protocol such as 802.11. Short range wireless data communication is feasible because the exemplary embodiments described herein need not establish wireless data communication between the client system 106 and the server system 108 until after the aircraft 102 has landed.

The CMU 210 may also be configured to support data communication over a cable, a wired connection, or other physical link. In this regard, any number of suitable data communication protocols, techniques, or methodologies may be supported by the CMU 210, including, without limitation: Ethernet; USB; IEEE 1394 (Firewire); and proprietary data communication protocols. Accordingly, the CMU 210 may include or utilize a suitably configured and formatted port, connector, jack, plug, receptacle, socket, adaptor, or the like.

The data storage element 212 may be realized using one or more physical devices having appropriate computer readable media, as mentioned above for the data storage element 116 (FIG. 1). This onboard data storage element 212 can be utilized to store diagnostic data, fault information, flight data, and other data collected by various onboard data sources. In this regard, data can be stored in data storage element 212 during flight (and/or during any operating phase of the aircraft) and thereafter transferred to a remote system, subsystem, or computing device, such as the server system 108 (FIG. 1).

The MCDU 214 provides display and user interface functionality to the flight crew, maintenance personnel, etc. In practice, the MCDU 214 can be a single hardware component that includes one or more display elements and one or more user interface elements. In this regard, the MCDU 214 may utilize any known display technology (e.g., a cathode ray tube, an LCD panel, an OLED display, a plasma display), and the display element can be shaped and sized to suit the needs of the particular application. User interface features of the MCDU 214 may include a keypad, keys, buttons, switches, knobs, a touchpad, a joystick, a pointing device, a virtual writing tablet, or any device, component, or function that enables the user to select options, input information, or otherwise interact with the MCDU 214.

Figure 3:
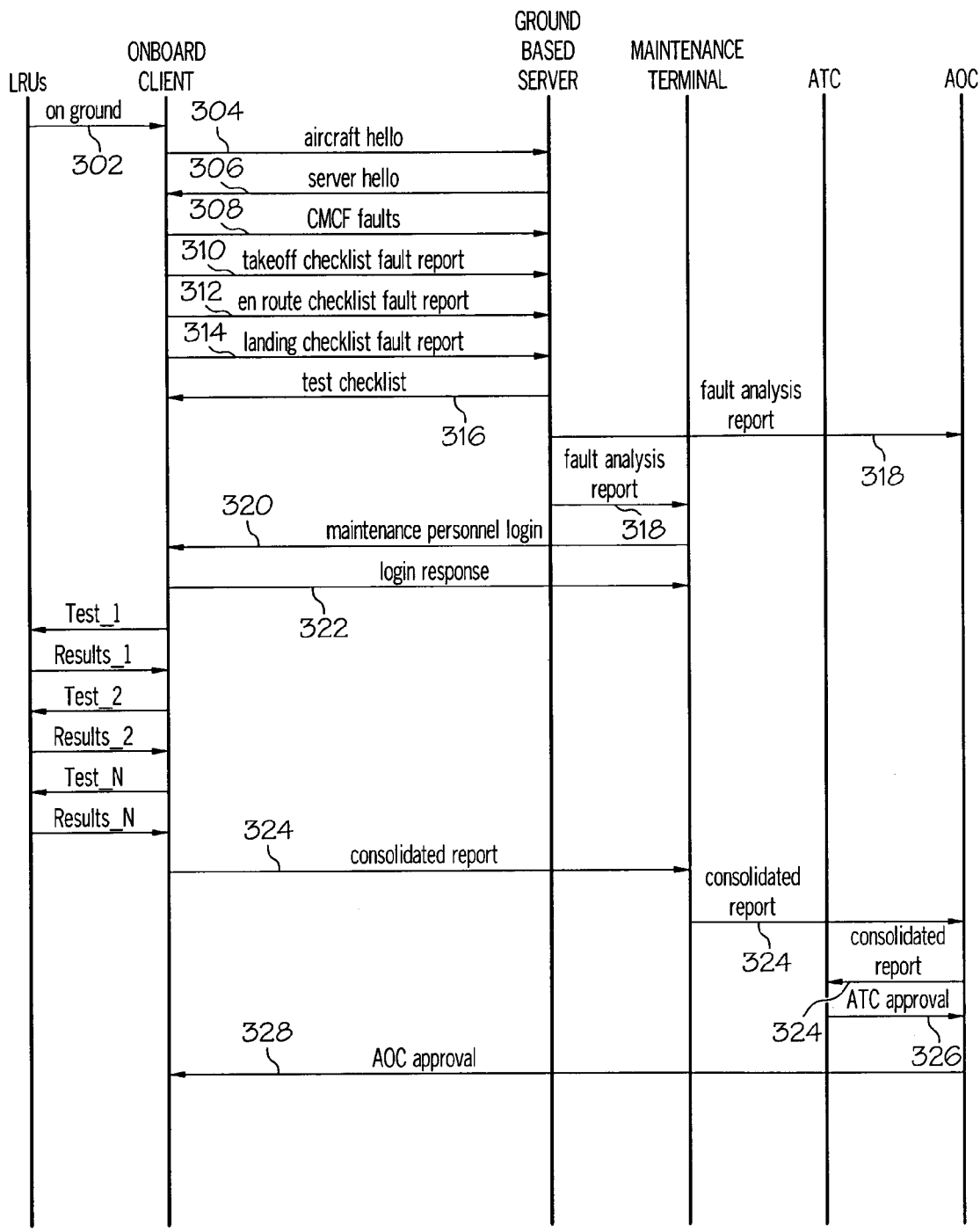
FIG. 3 is a ladder diagram that depicts communication between various elements of an automated fault analysis and testing system.
Figure 4:
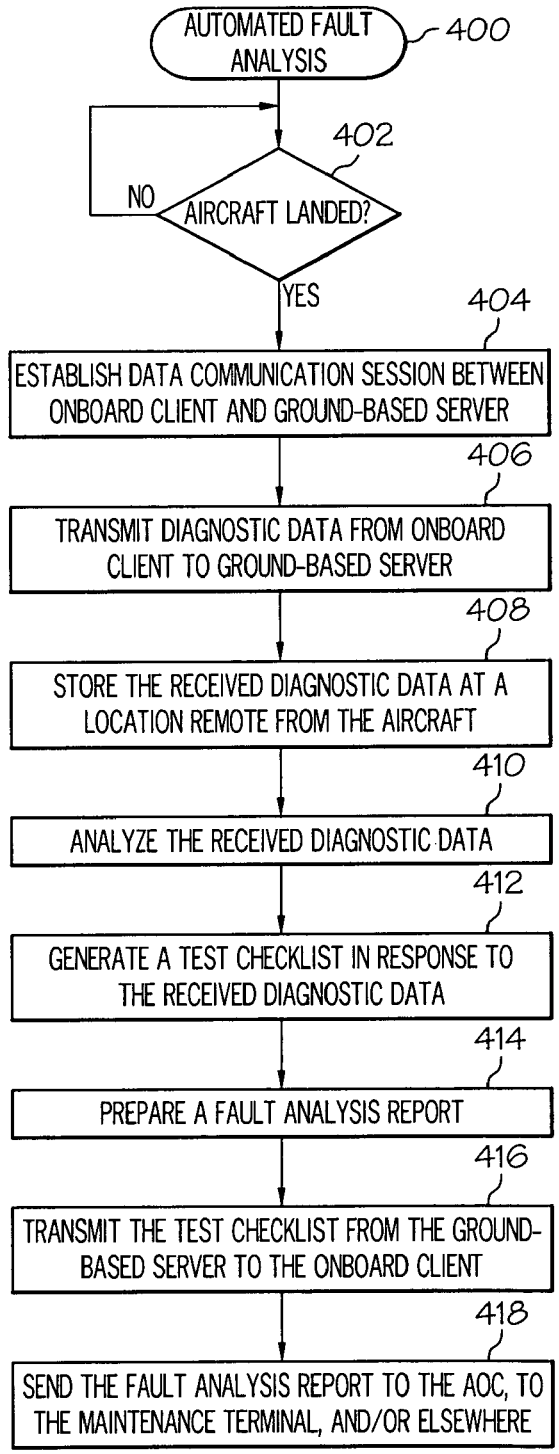
FIG. 4 is a flow chart that illustrates an exemplary embodiment of an automated fault analysis process.
Figure 5:
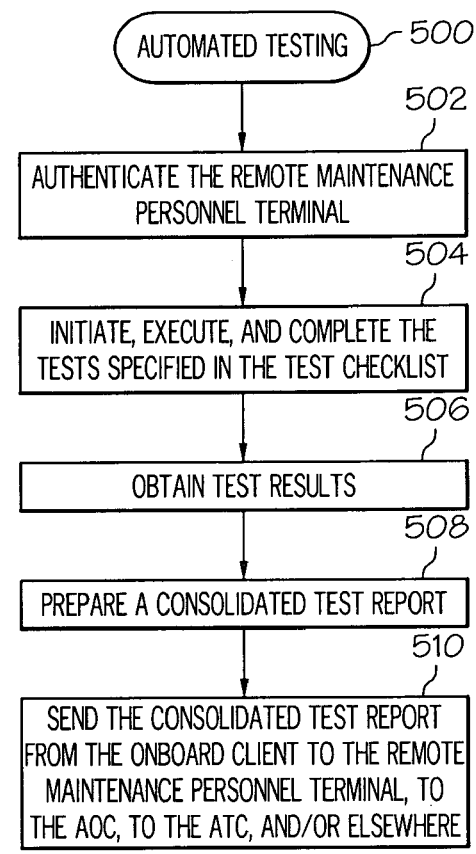
FIG. 5 is a flow chart that illustrates an exemplary embodiment of an automated testing process.

The automated fault analysis and testing system 100 can be used to automatically downlink diagnostic aircraft data (collected during flight) to a remote ground-based system, and to partially or wholly automate post-flight and pre-flight maintenance tests before the next flight leg. In this regard, FIG. 3 is a ladder diagram that depicts communication between various elements of an automated fault analysis and testing system, FIG. 4 is a flow chart that illustrates an exemplary embodiment of an automated fault analysis process 400, and FIG. 5 is a flow chart that illustrates an exemplary embodiment of an automated testing process 500. The various tasks performed in connection with an illustrated process may be performed by software, hardware, firmware, or any combination thereof. For illustrative purposes, the following description of process 400 and process 500 may refer to elements mentioned above in connection with FIG. 1 and FIG. 2. In practice, portions of a described process may be performed by different elements of the described system, e.g., an onboard component, a ground-based component, a communication module, etc. It should be appreciated that an embodiment of a described process may include any number of additional or alternative tasks, or may omit one or more of the illustrated tasks. Moreover, the tasks shown in FIG. 4 and FIG. 5 need not be performed in the illustrated order, and an embodiment of a described process may be incorporated into a more comprehensive procedure or process having additional functionality not described in detail herein.

FIG. 3 depicts a number of system components and data communicated among those components. The vertical lines in FIG. 3 correspond to: one or more LRUs; an onboard client (such as the client system 106 described above); a ground-based server (such as the server system 108 described above); a maintenance personnel terminal; an ATC system; and an AOC. The downward vertical direction of FIG. 3 represents increasing time.

The illustrated version of process 400 begins by checking whether the aircraft has landed (query task 402). In practice, one or more LRUs of the aircraft may be suitably configured to notify the onboard client when the aircraft lands. For example, an LRU could send an "on ground" message 302 (FIG. 3) to the onboard client after the aircraft lands. Upon receipt of the "on ground" message the onboard client can proceed as needed. After the aircraft lands, process 400 continues by establishing a data communication session between the onboard maintenance test client system and a ground-based system, such as the ground-based maintenance test server system (task 404). This data communication uses at least one wireless data communication link, e.g., a wireless link that is associated with the onboard client. Of course, any number of wireless data communication links could be used to transfer information between the onboard client and the ground-based server. Moreover, the communication session between the onboard client and the ground-based server could utilize one or more tangible data communication links.

The wireless data communication link supported by the onboard client need not utilize a long range wireless technology or protocol. Rather, the onboard client could use a relatively short range or localized wireless data communication protocol. Such a short range wireless technology is suitable because the onboard client need not establish the data communication session until after the aircraft has landed. Accordingly, the system could be deployed at an airport or other destination that is capable of providing an appropriate area of wireless coverage. Preferred embodiments utilize one or more of the following wireless techniques and protocols to support the data communication session: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; satellite data communication protocols; GPRS; and proprietary wireless data communication protocols such as variants of Wireless USB. In certain embodiments, data is transferred in accordance with the Internet Protocol, although other data communication protocols could be used.

The data communication session may be initiated and established with a handshaking routine between the onboard client and the ground-based server. As depicted in FIG. 3, the onboard client sends an "aircraft hello" message 304 to the ground-based server, which responds with a "server hello" message 306. After completion of this handshake, the onboard client and the ground-based server can exchange information during the data communication session. Notably, this data communication session can be established at any time after touchdown of the aircraft, and information can be transferred while the aircraft is taxiing.

During the data communication session, certain diagnostic data is transmitted from the onboard client to the ground-based server (task 406). This diagnostic data is wirelessly transmitted from the onboard client, although it may also be routed to the ground-based server using one or more tangible data communication links. This diagnostic data may include data of various types, formats, and contexts. For example, this diagnostic data may include, without limitation: CMCF fault information; a CMCF fault report; AMCF fault information; an AMCF fault report; a takeoff checklist fault report; an en route checklist fault report; a landing checklist fault report; or the like. A CMCF fault report contains fault data generated by the CMCF, and an AMCF fault report contains fault data generated by the ACMF (see FIG. 2). A takeoff checklist fault report contains fault information associated with diagnostic checks/tests performed during the takeoff phase of the flight, an en route checklist fault report contains fault information associated with diagnostic checks/tests performed during flight, and a landing checklist fault report contains fault information associated with diagnostic checks/tests performed during the landing phase of the flight. FIG. 3 depicts the onboard client transmitting CMCF faults 308, a takeoff checklist fault report 310, an en route checklist fault report 312, and a landing checklist fault report 314 to the ground-based server.

In certain embodiments, the diagnostic data received at the ground-based server is stored at a location that is remote from the aircraft (task 408). As explained above with reference to FIG. 1, the diagnostic data could be stored in a data storage element that is co-located with (or otherwise associated with) the ground-based server. The ground-based server may also analyze and process the received diagnostic data (task 410) in an appropriate manner, such that the identified faults can be addressed as needed. For example, the diagnostic data could be automatically analyzed for purposes of generating at least one test checklist for the aircraft (task 412). Notably, the content of the test checklist will be influenced or determined by the diagnostic data. As used here, a test checklist may be a post-flight checklist, a pre-flight checklist, a preventative maintenance checklist, a takeoff checklist, an en route checklist, a landing checklist, or any combination thereof. The ground-based server may also prepare one or more fault analysis reports from the diagnostic data (task 414). A fault analysis report may be formatted and prepared in an appropriate manner such that a human operator can review and interpret it.

Different airlines may use different checklists and testing protocols. Moreover, different aircraft models and/or aircraft from different manufacturers may use different checklists and testing protocols. Accordingly, the content of a given maintenance test checklist may be influenced by the respective airline, aircraft model, aircraft type, and/or aircraft manufacturer. Moreover, the content of a given maintenance test checklist may be influenced by the fault data collected during one or more previous flights. Thus, the ground-based data storage element 116 (FIG. 1) can store different test checklist templates, applicable maintenance tests, testing protocols, and other information that might be specific to an airline, an aircraft manufacturer, an aircraft type or classification, an aircraft model number, or the like.

Process 400 may continue by transmitting the test checklist from the ground-based server to the onboard client (task 416). In preferred embodiments, task 416 is performed during the same data communication session established during task 404, and the test checklist is wirelessly received by the onboard client. FIG. 4 depicts the test checklist 316 being successfully sent from the ground-based server to the onboard client. Process 400 may also send a copy of the fault analysis report from the ground-based server to the AOC, to the maintenance personnel terminal, and/or elsewhere (task 418). FIG. 4 depicts the fault analysis report 318 being successfully sent to the AOC and to the maintenance personnel terminal.

Some time after the test checklist has been received by the onboard client, one or more of the tests specified on the checklist can be initiated and executed. For ease of description and illustration, certain tasks and steps associated with the testing procedure are found in process 500 (in practice, however, these tasks could be included in process 400). In certain implementations, process 500 may begin by establishing an interactive control session (e.g., a secure session) with a remote maintenance personnel terminal. In this regard, process 500 authenticates the remote maintenance personnel terminal (task 502) or, equivalently, the user of the maintenance personnel terminal. This control session may be initiated and established with a handshaking routine between the maintenance personnel terminal and the onboard client. As depicted in FIG. 3, the maintenance personnel terminal sends a "maintenance personnel login" message 320 to the onboard client, which responds with a "login response" message 322. After completion of this handshake, the onboard client and the maintenance personnel terminal can exchange data and/or control commands during the control session.

After authentication of the maintenance personnel terminal, process 500 will initiate, execute, control, and/or complete the tests that are specified in the test checklist (task 504). In some situations, the maintenance personnel terminal is used to merely initiate one or more tests, which are automatically executed and completed onboard the aircraft without any human intervention during the actual execution of the tests. In other situations, one or more tests are executed and completed onboard the aircraft with some human interaction or involvement. For example, a user of the remote maintenance personnel terminal (while logged in) could monitor, control, supervise, manage, or otherwise influence the manner in which the tests are executed. Indeed, some tests may require human involvement (such as data entry, selection of options, data recording, etc.), and the system described here can accommodate such tests.

Some non-critical tests that do not require any human supervision or interaction can be fully automated and performed even before the aircraft has reached the terminal or hanger area. In other words, such non-critical tests could be performed or initiated while the aircraft is still taxiing. Other tests may require human involvement and/or supervision. These type of tests may be initiated and executed after the aircraft is stationary and after maintenance personnel has boarded the aircraft.

In practice, the onboard client may cooperate with one or more of the LRUs to execute (automatically or otherwise) the tests onboard the aircraft. In this regard, FIG. 3 depicts the onboard client sending test commands to the LRUs, which perform the requested tests and eventually return respective test results to the onboard client. FIG. 3 generally depicts how any number of tests can be performed at this time (the variable N can be any number). The labels Test_1, Test_2, and Test_N represent instructions or commands that initiate or execute the respective tests, and the labels Results_1, Results_2, and Results_N represent the associated test results being sent from the LRUs to the onboard client. In this manner, the onboard client can obtain the test results for the maintenance tests specified on the current test checklist (task 506).

For this particular embodiment, the onboard client prepares a consolidated test report upon completion of the designated maintenance tests (task 508). This test report can be arranged and formatted to suit the needs of the particular system deployment. For instance, the test report may be formatted and prepared in an appropriate manner such that a human operator can review and interpret it. The onboard client can send the test report to one or more destinations, such as the remote maintenance personnel terminal, the ATC system, the AOC, and/or elsewhere (task 510). FIG. 3 depicts the consolidated test report 324 being successfully sent from the onboard client to the maintenance personnel terminal. FIG. 3 also depicts a scenario where a copy of the consolidated test report 324 is sent from the maintenance personnel terminal to the AOC, and where a copy of the consolidated test report 324 is sent from the AOC to the ATC. Of course, the manner in which the consolidated test report 324 is routed and distributed throughout the system may vary, and FIG. 3 depicts only one possible scenario.

The ATC system (or a user of the ATC system) reviews the consolidated test report to determine whether or not the aircraft is now flight worthy. If the test results summarized on the test report indicate that the aircraft has passed the necessary maintenance tests and checks, then the ATC system can send an "ATC approval" message 326 to the AOC, as depicted in FIG. 3. the "ATC approval" message 326 indicates that the ATC system has approved the aircraft for takeoff. In turn, the AOC (or a user of the AOC) can respond to the "ATC approval" message 326 by issuing an "AOC approval" message 328 to the onboard client. The "AOC approval" message 328 indicates that the AOC has approved the aircraft for takeoff. In response to the "AOC approval" message 328, the onboard client can proceed as necessary to prepare the aircraft for the next flight leg.

The techniques and technologies described above facilitate the automated downlinking of CMCF fault reports at the end of each flight leg, and the automation of CMCF fault analysis. The system provides a foolproof method of performing aircraft checks while eliminating the possibility of missing inspection steps or maintenance tests. Moreover, the automation of maintenance tests reduce human workloads and reduces inspection costs.

Exemplary Maintenance Tests

Although the system described herein can accommodate a number of different tests, a number of practical tests are listed and categorized below. This listing of specific tests is not intended to limit or otherwise restrict the scope of the recited subject matter.

FCS tests: trim alignments (performs trim tests for the control surfaces); control surface movement tests (performs control surface movement tests and verifies that actuators and sensors are working correctly for the surfaces controlled by the FCS); LRU health tests (performs the health checks for the LRUs).

Engine tests: engine temperatures test (checks engine performance by measuring the temperatures at full throttle, half throttle, etc.); engine RPM tests (checks the actual RPM against the expected measurements in semi throttle and full throttle situations); hydraulic pump tests (measures the hydraulic pressures at full throttle, half throttle, and least throttle to ensure that sufficient minimum pressure is developed in the aircraft); electrical tests (sufficient power is generated at full throttle, half throttle, and least throttle to ensure minimum voltage and power to all the avionics sub-systems).

FMS tests: flight plan checks (ensures that correct versions of the flight plans are loaded in the FMS by checking the source and destination airports); weather maps checks (ensures correct weather maps are loaded for the region with the correct date); charts and maps checks (ensures appropriate layouts and maps are loaded corresponding to the source airport and destination airport).

Communication tests: navigation radios test (ensures that all the navigational radios are operational by checking certain parameters); GPS tests (ensures that the GPS devices are working correctly by cross verification of known GPS coordinates with the ATC, allowing a small tolerance; CMU tests (ensures that the CMU is functional by sending ACARS messages with the aircraft health report to the AOC/ATC); link tests (verifies that sub-networks are operational by sending ACARS messages through the available sub-networks).

Surveillance tests: radar tests (ensures that radar is working satisfactorily); TCAS tests (ensures that all TCAS transponders work correctly); EGPWS tests (ensures that the EGPWS unit is working correctly by capturing snapshots at known reference points in the previous flights and analyzing them).

Displays tests: MCDU tests (ensure that all pages display as expected).

Mechanical tests: brake tests (check braking action, measure wheel temperature, and pressure to ensure everything works as expected); airframe tests (capture aircraft images through a high resolution camera and ensure that there are no cracks or fissures on the surface); wheel/tire tests (capture snapshots of each wheel and tire treads to ensure they appear normal); oil temperature/pressure/quantity tests (verify that the oil quantity, temperature, and pressure are at normal levels and verify that oil change date has not been passed).

IFE tests: Ensure all IFE units are functioning as expected. This can be ensured by sending specific commands to the IFE unit from the IFE server and collecting the status of the unit. The fault report found in the server can be used to detect the faults in the respective IFE.

EFB tests: the CMU can initiate the EFB test on ground to check its functionality. The CMU can send some test messages or commands to the EFB and analyze the response to check its behavior. Faults can be logged and downlinked to the ground-based server in case the EFB fails to send the response or an invalid response is received from the EFB.

Lights tests: lighting functionality in the aircraft can tested by switching on all the lights in the aircraft and measuring the total voltage drop.

Cabin temperature/pressure tests: data received from different sensors can be captured for a period of time and analyzed to get the average cabin temperature and pressure.

Security and anti sabotage check: cameras or scanners can be installed at the entrances to the aircraft to capture the details of the maintenance person entering the cockpit for maintenance related activity.

Refueling: sensors capturing fuel information can be read and the amount of fuel left in the tank can be read. The remaining amount of fuel can be compared to the expected fuel required for the next successive leg.

Landing gear and wheel wells: the landing gear fault detection logic mechanism can be invoked to check any related faults. Pressure sensors can be read to measure the wheel pressure.

Fuselage, wind and empennage tests: cameras can be installed near the gate or terminal to scan and record the aircraft exterior body image. Image processing can be performed to find any cracks in the structure. Sensors can be scattered and interconnected at regular intervals on the aircraft body to detect any cracks in the aircraft structure.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of automated fault analysis and execution of post-flight or pre-flight tests for an aircraft having an onboard maintenance test client system, the method comprising:

establishing a data communication session with the onboard maintenance test client system after the aircraft has landed, the data communication session using at least one wireless data communication link;

receiving, at a ground-based maintenance test server system, diagnostic data from the onboard maintenance test client system during the data communication session;

thereafter, generating a test checklist for the aircraft, wherein content of the test checklist is influenced by the diagnostic data, and wherein the test checklist is generated by the ground-based maintenance test server system;

thereafter, transmitting the test checklist from the ground-based maintenance test server system to the onboard maintenance test client system during the data communication session;

thereafter, receiving a test report at an air traffic control system, the test report comprising results of maintenance tests specified on the test checklist, wherein the maintenance tests are performed onboard the aircraft in response to receiving the test checklist from the ground-based maintenance test server system;

reviewing the test report at the air traffic control system to determine that the aircraft is flight worthy;

in response to determining that the aircraft is flight worthy, sending an approval message from the air traffic control system to an airlines operations center; and in response to the approval message, sending a takeoff approval message from the airlines operations center to the onboard maintenance test client system.

2. The method of claim 1, further comprising the step of preparing a fault analysis report from the diagnostic data.

3. The method of claim 2, further comprising the step of sending the fault analysis report to a maintenance personnel terminal.

4. The method of claim 2, further comprising the step of sending the fault analysis report to an airlines operations center.

5. The method of claim 1, wherein receiving diagnostic data comprises receiving a takeoff checklist fault report, an en route checklist fault report, or a landing checklist fault report.

6. The method of claim 1, wherein receiving diagnostic data comprises receiving central maintenance computing function (CMCF) fault information.

7. The method of claim 1, further comprising the step of storing the diagnostic data at a location remote from the aircraft.

8. The method of claim 1, wherein content of the test checklist is influenced by the characteristics of the aircraft.

9. The method of claim 1, wherein content of the test checklist is influenced by an airline associated with the aircraft.

10. A method of automated fault analysis and execution of post-flight or pre-flight tests for an aircraft, the method comprising:

establishing a data communication session between an onboard maintenance test client system and a ground-based system after the aircraft has landed, the data communication session using at least one wireless data communication link;

sending diagnostic data from the onboard maintenance test client system to the ground-based system during the data communication session;

thereafter, obtaining a test checklist for the aircraft from the ground-based system, wherein content of the test checklist is influenced by the diagnostic data, and wherein the test checklist is obtained at the onboard maintenance test client system; and thereafter, completing at least one test specified in the test checklist, and generating an associated test report;

providing the test report to an air traffic control system;

reviewing the test report at the air traffic control system to determine that the aircraft is flight worthy;

in response to determining that the aircraft is flight worthy, sending an approval message from the air traffic control system to an airlines operations center; and in response to the approval message, sending a takeoff approval message from the airlines operations center to the onboard maintenance test client system.

11. The method of claim 10, wherein sending diagnostic data comprises sending a takeoff checklist fault report, an en route checklist fault report, or a landing checklist fault report.

12. The method of claim 10, wherein sending diagnostic data comprises sending central maintenance computing function (CMCF) fault information.

13. The method of claim 10, wherein the step of completing at least one test comprises automatically executing the at least one test onboard the aircraft, without human intervention during execution.

14. The method of claim 10, wherein the step of completing at least one test comprises executing the at least one test onboard the aircraft, with human interaction during execution.

15. The method of claim 10, further comprising:

establishing an interactive control session with a remote maintenance personnel terminal; and controlling, with the remote maintenance personnel terminal, execution of the at least one test.

16. A system for automated fault analysis and execution of post-flight or pre-flight tests for an aircraft, the system comprising:

a maintenance test client system onboard the aircraft; and a ground-based maintenance test server system that is remote from the aircraft;

an air traffic control system; and an airlines operations center;

the maintenance test client system being configured to collect fault data for the aircraft, and to wirelessly transmit the fault data to the ground-based maintenance test server system after the aircraft has landed;

the ground-based maintenance test server system being configured to receive the fault data, to generate a test checklist that is influenced by the fault data, and to transmit the test checklist to the maintenance test client system;

the maintenance test client system being further configured to wirelessly receive the test checklist, to initiate execution of at least one test specified in the test checklist, and to generate a test report that includes results of the at least one test specified in the test checklist;

the maintenance test client system being further configured to provide the test report to the air traffic control system;

the air traffic control system being configured to review the test report to determine that the aircraft is flight worthy, and to send an approval message to the airlines operations center; and the airlines operation center being configured to respond to the approval message by sending a takeoff approval message to the onboard maintenance test client system.

17. The system of claim 16, further comprising line replaceable units (LRUs) onboard the aircraft, wherein the maintenance test client system cooperates with the LRUs to execute the at least one test.

18. The system of claim 17, wherein the maintenance test client system and the LRUs automatically execute the at least one test onboard the aircraft, without human intervention during execution.

19. The system of claim 16, further comprising a maintenance personnel terminal that is remote from the aircraft, wherein the maintenance test client system establishes an interactive control session with the maintenance personnel terminal, and wherein the maintenance personnel terminal is configured to remotely control execution of the at least one test.

* * * * *